United States Patent
Lee et al.

(10) Patent No.: US 9,017,857 B2
(45) Date of Patent: Apr. 28, 2015

(54) ELECTRODE TERMINAL CONNECTING DEVICE AND BATTERY MODULE ASSEMBLY EMPLOYED WITH THE SAME

(75) Inventors: Bumhyun Lee, Seoul (KR); Yongshik Shin, Daejeon (KR); Jin Kyu Lee, Busan (KR); Jongmoon Yoon, Daejeon (KR); Jae Hun Yang, Daejeon (KR)

(73) Assignee: LG Chem, Ltd., Seoul (KR)

(*) Notice: Subject to any disclaimer, the term of this patent is extended or adjusted under 35 U.S.C. 154(b) by 818 days.

(21) Appl. No.: 12/672,164

(22) PCT Filed: Sep. 4, 2009

(86) PCT No.: PCT/KR2009/004996
§ 371 (c)(1),
(2), (4) Date: Jul. 1, 2010

(87) PCT Pub. No.: WO2010/071292
PCT Pub. Date: Jun. 24, 2010

(65) Prior Publication Data
US 2011/0223466 A1    Sep. 15, 2011

(30) Foreign Application Priority Data

Dec. 17, 2008  (KR) .................. 10-2008-0128785

(51) Int. Cl.
*H01M 2/24*    (2006.01)
*H01M 2/20*    (2006.01)
*H01M 2/10*    (2006.01)

(52) U.S. Cl.
CPC ............ *H01M 2/206* (2013.01); *H01M 2/1077* (2013.01)

(58) Field of Classification Search
USPC ........................................................ 429/158
See application file for complete search history.

(56) References Cited

U.S. PATENT DOCUMENTS

| 6,544,070 B1 | 4/2003 | Radliff |
| 2004/0180261 A1* | 9/2004 | Saito et al. ................. 429/176 |

(Continued)

FOREIGN PATENT DOCUMENTS

| EP | 1 883 126 A1 | 1/2008 |
| JP | 07-130353 | 5/1995 |
| JP | 09-106802 | 4/1997 |

(Continued)

*Primary Examiner* — Ula C Ruddock
*Assistant Examiner* — Jacob Marks
(74) *Attorney, Agent, or Firm* — Birch, Stewart, Kolasch & Birch, LLP

(57) ABSTRACT

Disclosed herein is an electrode terminal connecting device for electrically interconnecting two or more battery modules, including a conductive connecting member for electrically interconnecting electrode terminals of the battery modules, the conductive connecting member having two through-holes formed at positions corresponding to the distance between the electrode terminals, an insulative sheathing member for surrounding the conductive connecting member, a portion of an open rear of the insulative sheathing member being closed for easy installation of the conductive connecting member, the insulative sheathing member including a side wall protruding from the outer circumference of the conductive connecting member such that the side wall has a predetermined height, and an insulative cap connected to the top of the insulative sheathing member by a hinge structure for opening and closing an open front of the insulative sheathing member, the insulative cap having hollow buffers protruding from the inside thereof for surrounding portions of the electrode terminals protruding through the through-holes.

19 Claims, 4 Drawing Sheets

(56) References Cited

U.S. PATENT DOCUMENTS

2005/0260491 A1 11/2005 Cho
2007/0026036 A1 2/2007 Falotico et al.

FOREIGN PATENT DOCUMENTS

| | | |
|---|---|---|
| JP | 10-106538 | 4/1998 |
| JP | 2000-149909 | 5/2000 |
| JP | 2001-332232 | 11/2001 |
| JP | 2006-228706 A | 8/2006 |
| JP | 2008-166008 A | 7/2008 |
| KR | 10-2001-0056041 A | 7/2001 |
| KR | 10-2006-0110408 A | 10/2006 |
| KR | 10-2006-0110580 A | 10/2006 |

* cited by examiner

[Fig. 1]
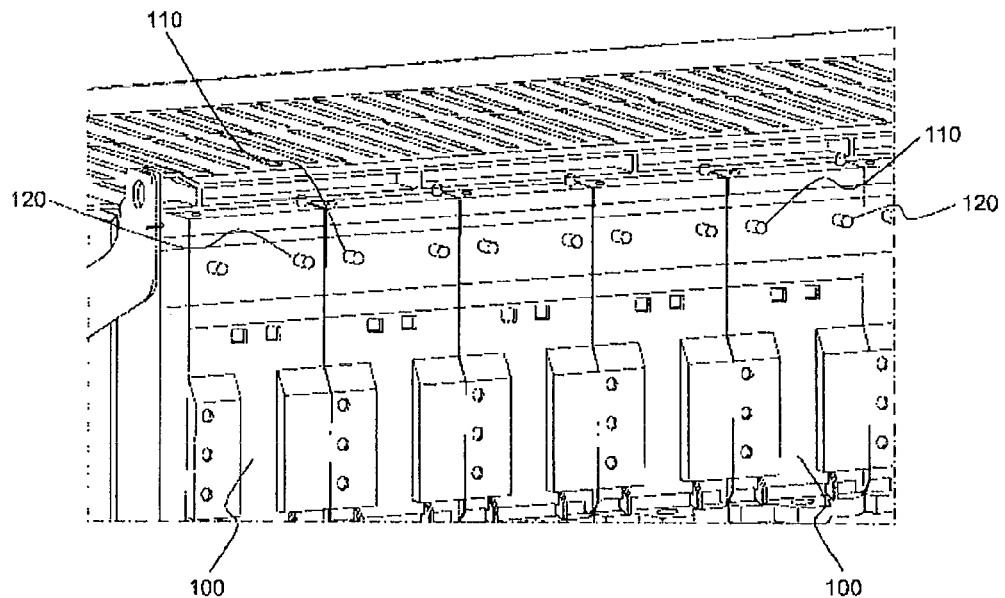
[Fig. 2]
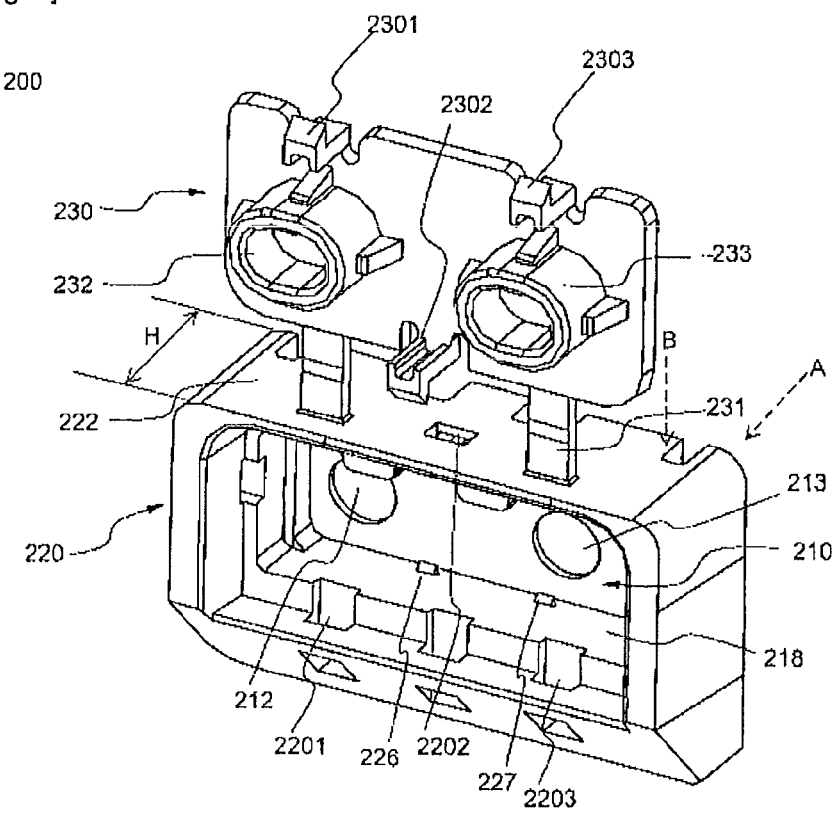

[Fig. 3]
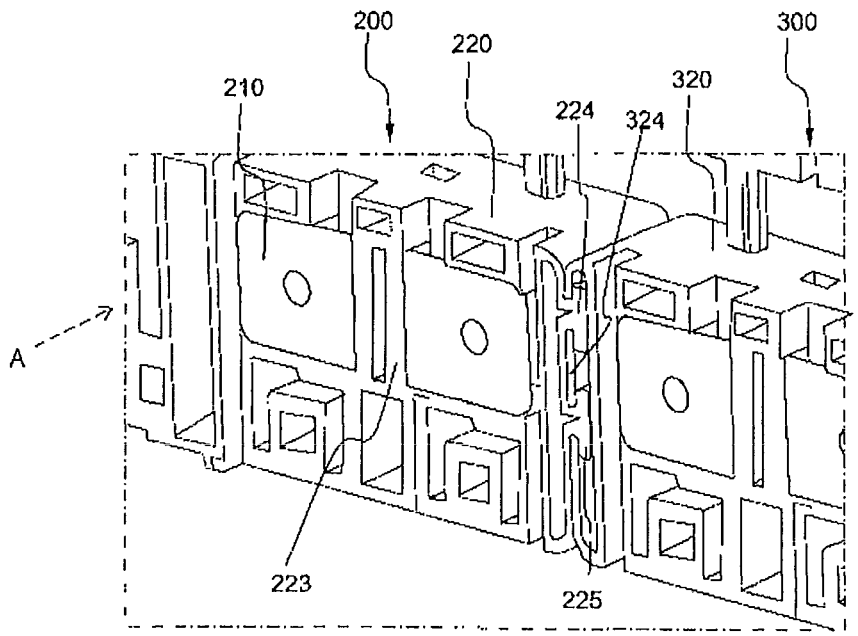
[Fig. 4]
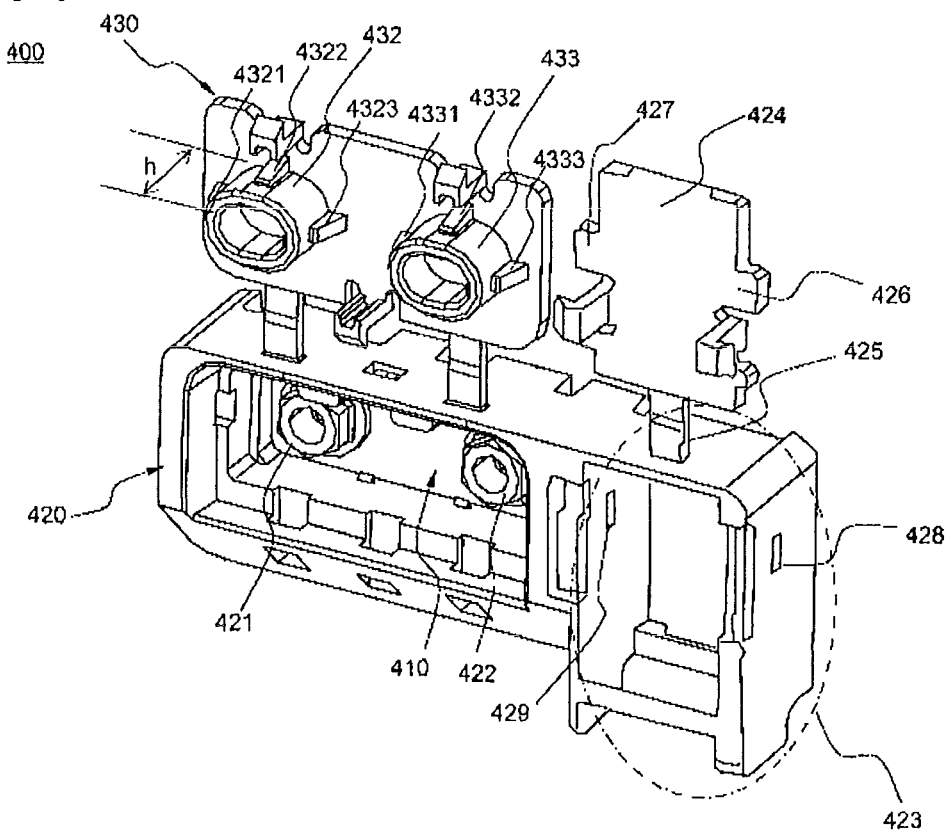

[Fig. 5]
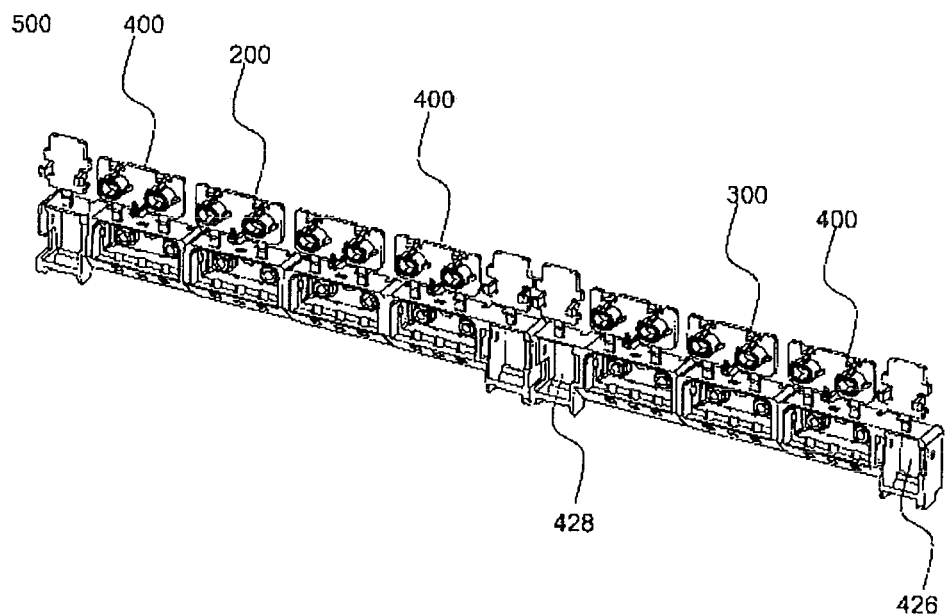
[Fig. 6]
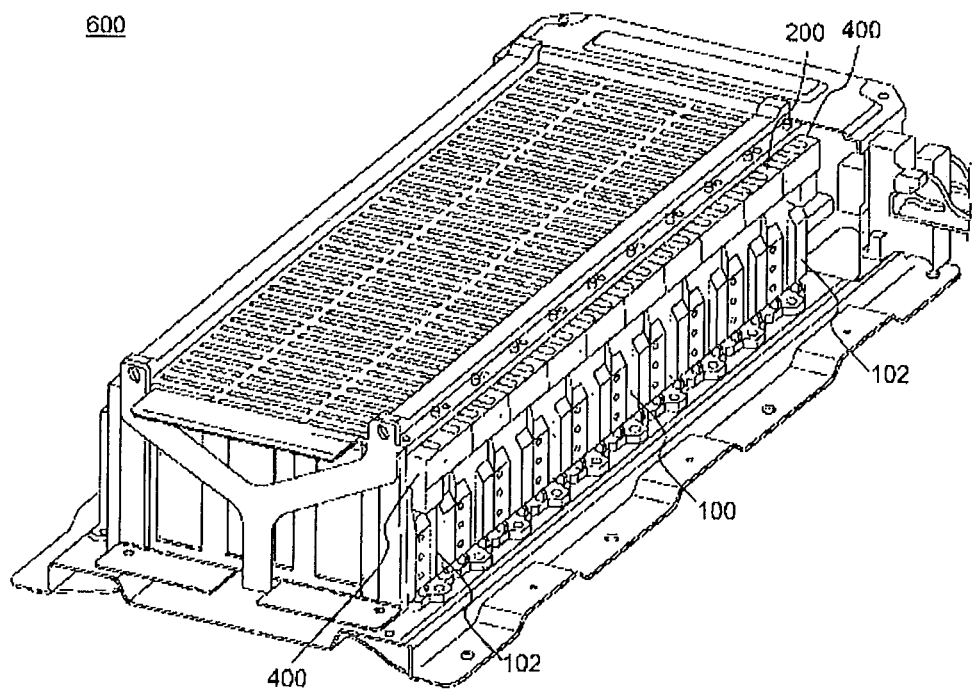

[Fig. 7]
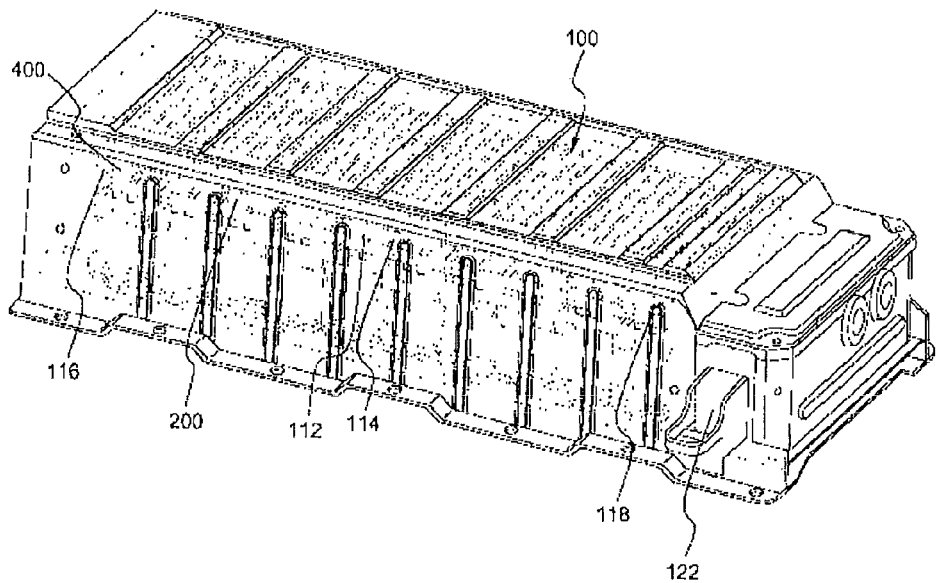
[Fig. 8]
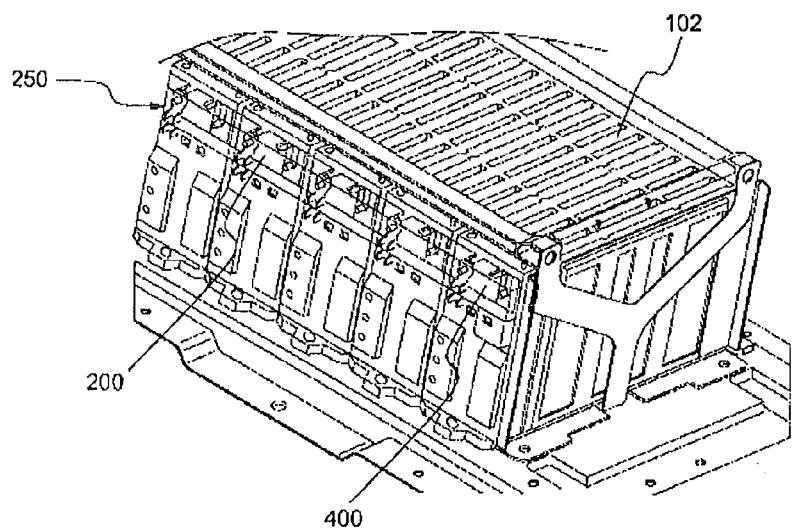

ELECTRODE TERMINAL CONNECTING DEVICE AND BATTERY MODULE ASSEMBLY EMPLOYED WITH THE SAME

TECHNICAL FIELD

The present invention relates to a device for electrically interconnecting two or more battery modules, and, more particularly, to an electrode terminal connecting device including a conductive connecting member for electrically interconnecting electrode terminals of the battery modules, the conductive connecting member having two through-holes formed at positions corresponding to the distance between the electrode terminals, an insulative sheathing member for surrounding the conductive connecting member, a portion of an open rear of the insulative sheathing member being closed for easy installation of the conductive connecting member, the insulative sheathing member including a side wall protruding from the outer circumference of the conductive connecting member such that the side wall has a predetermined height, and an insulative cap connected to the top of the insulative sheathing member by a hinge structure for opening and closing an open front of the insulative sheathing member, the insulative cap having hollow buffers protruding from the inside thereof for surrounding portions of the electrode terminals protruding through the through-holes.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Generally, a battery module is manufactured by placing a plurality of unit cells in a cartridge in a state in which the unit cells are connected in series and/or parallel to one another and electrically interconnecting the plurality of cartridges. According to circumstances, a middle- or large-sized battery pack or system having two or more battery modules electrically connected to each other is manufactured to provide higher power.

Consequently, the connection between electrode terminals is needed for electrical connection between batteries (including unit cells), battery cartridges, or battery modules and for connection of the batteries, the battery cartridges, or the battery modules to an external device to which power will be supplied from the batteries, the battery cartridges, or the battery modules.

However, electrode terminal connection regions have a high likelihood of short circuiting when external impact is applied to the electrode terminal connection regions. Furthermore, high voltage flows in the electrode terminal connection regions. Consequently, attention must be paid to the electrode terminal connection regions during work or use.

For example, for a middle- or large-sized battery pack mounted in an electric vehicle or a hybrid electric vehicle, a pack case of the battery pack is made of a metal material which provides desired mechanical strength to the pack case. Consequently, when external impact, for example due to a car collision, is applied to the middle- or large-sized battery pack, the pack case is deformed, with the result that the pack case may come into contact with electrode terminal connection regions of battery modules, whereby short circuits may occur.

In order to solve this problem, some prior arts suggest a method of arranging the electrode terminal connection regions of the battery module in the lateral direction of a vehicle, not in the frontward-and-backward direction of the vehicle having a great possibility of collision or a method of providing an extra space for impact alleviation at the front of the battery module when the electrode terminal connection regions of the battery module are arranged in the frontward-and-backward direction of the vehicle. However, the above-suggested technologies have a problem in that arrangement efficiency of the battery module in a device is greatly deteriorated.

In connection with this matter, some of the prior arts suggest a battery module constructed in a structure in which electrode terminal connection regions are closed by protection covers. For example, Japanese Patent Application Publication No. 2006-228706 discloses a battery module including a bus bar for electrically inter-connecting adjacent batteries, an electrically insulative side plate for supporting the bus bar, a coupling member for coupling the bus bar to output terminals disposed at sides of the batteries, and an electrically insulative protection cover for closing the side plate, the protection cover having an opening through which the coupling member is inserted.

However, the protection cover of the disclosure is not provided with an additional member for impact alleviation. As a result, the protection cover has problems in that the protection cover may not protect the connection regions when external impact is applied, and therefore, it is not possible to fundamentally prevent the occurrence of a short circuit and thus the occurrence of a fire.

Consequently, there is a high necessity for an electrode terminal connecting device that is capable of fundamentally solving the above problems, effectively achieving electrical connection between battery modules, isolating electrode terminal connection regions from the outside, and alleviating external impact when the external impact is applied.

DISCLOSURE OF INVENTION

Technical Problem

Therefore, the present invention has been made to solve the above problems, and other technical problems that have yet to be resolved.

It is an object of the present invention to provide an electrode terminal connecting device that is capable of achieving connection between electrode terminals, isolating electrode terminal connection regions from the outside, and preventing the occurrence of a short circuit and thus the occurrence of a fire.

It is another object of the present invention to provide an electrode terminal connecting device that is capable of easily achieving the mechanical coupling between electrode terminals of battery modules and a battery module assembly including the same.

Technical Solution

In accordance with one aspect of the present invention, the above and other objects can be accomplished by the provision of an electrode terminal connecting device for electrically interconnecting two or more battery modules, including: a conductive connecting member for electrically interconnecting electrode terminals of the battery modules, the conductive connecting member having two through-holes formed at positions corresponding to the distance between the electrode terminals; an insulative sheathing member for surrounding the conductive connecting member, a portion of an open rear of the insulative sheathing member being closed for easy installation of the conductive connecting member, the insulative sheathing member including a side wall protruding from the outer circumference of the conductive connecting member such that the side wall has a predetermined height; and an insulative cap connected to the top of the insulative sheathing member by a hinge structure for opening and closing an open front of the insulative sheathing member, the insulative cap having hollow buffers protruding from the inside thereof for surrounding portions of the electrode terminals protruding through the through-holes.

The electrode terminal connecting device according to the present invention includes the conductive connecting member, the insulative sheathing member, and the insulative cap, which are constructed to have the specific structures as described above, and therefore, it is possible to achieve coupling of the conductive connecting member to the electrode terminals of the battery modules, stable installation of the insulative sheathing member, and protection of the electrical connection regions of the electrode terminals from the outside. In particular, even when a strong external force, such as a strong impact, is applied, the buffers of the insulative cap prevent, for example, other conductive members or conductive regions from contacting the electrical connection regions of the electrode terminals, whereby a danger of short circuit occurrence is greatly lowered.

In an exemplary embodiment, the insulative cap may be provided at an outer circumference thereof with at least one protrusion-type coupling portion, the insulative sheathing member is provided with a coupling groove corresponding to the protrusion-type coupling portion, and the protrusion-type coupling portion is fixedly fitted in the coupling groove of the insulative sheathing member, whereby the mechanical coupling of the insulative cap to the insulative sheathing member is achieved.

The mechanical coupling between the insulative sheathing member and the insulative cap is conducive to the easy assembly or maintenance of the battery modules. Also, the electrical connection regions are closed by the insulative sheathing member and the insulative cap, and therefore, it is possible to isolate electric current flowing in the conductive connecting member from the outside and to prevent the introduction of foreign matter and the permeation of moisture into the connection regions between the electrode terminals of the battery modules and the conductive connecting member.

Preferably, the insulative sheathing member is provided at the inside thereof with a coupling portion, protruding in a downwardly tapered structure, located at a height corresponding to a thickness of the conductive connecting member for maintaining the installation state of the conductive connecting member. Consequently, the outer circumference of the conductive connecting member may be stably coupled to the insulative sheathing member by the coupling portion protruding in the downwardly tapered structure. Specifically, when the conductive connecting member is inserted into the insulative sheathing member in a state in which the insulative sheathing member is located above the electrode terminals of the battery modules, the conductive connecting member is placed inside the insulative sheathing member. Once the conductive connecting member is placed inside the insulative sheathing member, however, the separation of the conductive connecting member from the inside of the insulative sheathing member is prevented by the coupling portion protruding in the downwardly tapered structure.

In an exemplary embodiment, the hollow buffers may have a height reaching the conductive connecting member in a state in which the insulative cap closes the open front of the insulative sheathing member. That is, when the insulative cap closes the open front of the insulative sheathing member, the hollow buffers support the insulative sheathing member and the insulative cap because the hollow buffers extends to the conductive connecting member. When external impact is applied, therefore, the connection regions between the electrode terminals of the battery modules and the conductive connecting member are protected from the external impact, thereby preventing the occurrence of a short circuit.

Generally, the degree of strain caused in a material due to an external force applied to the material is approximately in reverse proportion to the size of the material in the direction in which the external force is applied, and therefore, the hollow buffers exhibit strain tolerance corresponding to the height thereof. Even when the hollow buffers have a small thickness, therefore, the hollow buffers exhibit considerable strain tolerance, and therefore, it is possible to obtain a desired effect even through a simple structure.

The hollow buffers are not particularly restricted so long as the hollow buffers surround the protruding portions of the electrode terminals. Preferably, the hollow buffers are constructed in a hollow cylindrical structure integrally formed at the inside of the insulative cap.

In the above-described structure, each of the hollow buffers may be provided at the outer circumference of the hollow cylindrical structure thereof with at least one supporting rib located at a region where each of the hollow buffers abuts the insulative cap. The support rib effectively supports the outer circumference of the hollow cylindrical structure and the insulative cap, thereby greatly enhancing the mechanical strength of the hollow cylindrical structure formed at the insulative cap with respect to an external force applied to the hollow cylindrical structure.

The conductive connecting member is a member to achieve electrical connection between the electrode terminals. Preferably, the conductive connecting member has a length sufficient to electrically interconnect two electrode terminals.

The mechanical coupling of the conductive connecting member to the electrode terminals may be achieved in various manners. In an exemplary embodiment, portions of the electrode terminals inserted through the through-holes may be constructed in a male screw structure, whereby coupling members of a female screw structure may be coupled to the electrode terminals inserted through the through-holes.

In the above-described structure, each of the hollow buffers may be constructed in a structure to surround the outside of the coupling member coupled to a corresponding one of the electrode terminals. The hollow buffers surrounding the respective coupling members minimize spaces between the hollow buffers and the coupling members, and therefore, the degree of strain of the hollow buffers is further decreased when an external force is applied to the hollow buffers.

Preferably, the above-mentioned effect is maximized in a state in which the hollow buffers are in contact with the corresponding coupling members. For example, the hollow buffers may have hollow insides corresponding to the outsides of the coupling members coupled with the electrode terminals. This structure prevents the separation of the coupling members from the hollow buffers due to vibration or impact in a case in which the outsides of the coupling members are angled.

Meanwhile, in a middle- or large-sized battery module assembly constructed in a structure in which a plurality of battery modules are electrically connected to provide high power and large capacity while the battery modules are stacked, electrode terminals of the last battery module are connected to an external device needing power from the battery module via a linear connection member, such as a power cable. Also, when it is necessary to confirm the operation state of the battery modules and to repair the battery modules, a service plug may be located on a cathode or anode circuit to manually interrupt electric current.

At this time, a guide for guiding the linear connection member connected to the electrode terminals is further required for the insulative sheathing member of the electrode terminal connecting device mounted to the electrode terminals of the last battery module or the battery module needing to be electrically connected to the service plug, among the electrode terminal connecting devices for electrically interconnecting the respective battery modules.

In an exemplary embodiment, therefore, the insulative sheathing member may be further provided at one side thereof with a guide for easily achieving installation and wiring of another linear connection member. In addition, an insulative guide cap may be further provided to open and close the open front of the guide.

In this case, the guide may be constructed in a structure in which a hollow guide extends from a position corresponding to the electrode terminals of the battery modules. Specifically, the guide may be constructed in a structure in which a hollow guide extends upward or downward from a position corresponding to the electrode terminals of the battery modules based on a desired wiring position of the linear connection member.

In an exemplary embodiment, the insulative sheathing member may be provided at opposite sides thereof with a male-and-female coupling structure by which the insulative sheathing member of the electrode terminal connecting device is variably coupled to an insulative sheathing member of another electrode terminal connecting device. Consequently, it is possible to easily assemble a desired number of battery modules by the coupling structure formed at the opposite sides of the insulative sheathing member.

The male-and-female coupling structures may be constructed variously. For example, the male-and-female coupling structure may include a coupling protrusion extending in the height direction of the insulative sheathing member and a coupling groove corresponding to the coupling protrusion. The coupling protrusion may be located at the left side of the insulative sheathing member, and the coupling groove may be located at the right side of the insulative sheathing member. Alternatively, the coupling protrusion may be located at the right side of the insulative sheathing member, and the coupling groove may be located at the left side of the insulative sheathing member. In this structure, the coupling and separation between the coupling protrusion and the coupling groove of the insulative sheathing member may be performed in the frontward-and-rearward direction. Consequently, it is easy to install the insulative sheathing members to corresponding positions from the front, for example, in a state in which a plurality of battery modules are arranged in tight contact with one another or adjacent to one another.

It is possible for the electrode terminal connecting device according to the present invention to connect battery modules in series and/or parallel to one another, and therefore, easy design based on desired power and capacity is possible. Consequently, the present invention provides a battery module assembly wherein electrical connection is achieved using electrode terminal connecting devices.

In an exemplary embodiment, the battery module assembly may be constructed in a structure in which a plurality of battery modules, having cathode and anode terminals protruding from the same sides thereof, are in tight contact with one another. That is, a space formed by the protruding portions of the electrode terminals is smaller when the cathode and anode terminals are formed at the same side of each of the battery modules than when the cathode and anode terminals are formed at different sides of each of the battery modules, and therefore, it is possible to construct a more compact battery module assembly.

In this case, the electrode terminals of the battery modules may be arranged on the same line, and the electrode terminal connecting devices may be mechanically coupled to electrical connection regions of the electrode terminals of the battery modules.

A guide may be further formed at a desired position as needed. Preferably, a pair of electrode terminal connecting devices each further including a guide formed at one side of the insulative sheathing member thereof are disposed at the middle battery modules of the battery module assembly such that the electrode terminal connecting devices are adjacent to each other, and an electrode terminal connecting device further including a guide formed at one side of the insulative sheathing member is disposed at each of the outermost battery modules of the battery module assembly. In this structure, electrode terminal connecting devices including no guides may be arranged at the remaining region of the battery module assembly.

The battery module assembly according to the present invention is preferably used in a device or system which provides high-power, large-capacity electric power, is exposed to external forces, such as impact and vibration, and has a great possibility that conductive foreign matter or moisture is introduced during the operation. Representative examples of the device or system may include, but are not limited to, electric vehicles, hybrid electric vehicles, plug-in hybrid electric vehicles, electric motorcycles, and electric-powered tools.

BRIEF DESCRIPTION OF DRAWINGS

The above and other objects, features and other advantages of the present invention will be more clearly understood from the following detailed description taken in con-junction with the accompanying drawings, in which:

FIG. 1 is a partial typical view illustrating a side of a structure in which a plurality of battery modules are stacked;

FIG. 2 is a front perspective view illustrating an electrode terminal connecting device according to an embodiment of the present invention;

FIG. 3 is a rear perspective view illustrating the electrode terminal connecting device according to the embodiment of the present invention;

FIG. 4 is a perspective view illustrating an electrode terminal connecting device with an extending guide according to another embodiment of the present invention;

FIG. 5 is a typical view illustrating a structure in which the electrode terminal connecting devices of FIGS. 2 and 4 are arranged in a line;

FIGS. 6 and 7 are perspective views illustrating a battery module assembly having the electrode terminal connecting devices according to the present invention mounted thereto; and FIG. 8 is a partially enlarged view typically illustrating a portion where the electrode terminal connecting devices are mounted in FIG. 6.

MODE FOR THE INVENTION

Now, exemplary embodiments of the present invention will be described in detail with reference to the accompanying drawings. It should be noted, however, that the scope of the present invention is not limited by the illustrated embodiments.

FIG. 1 is a partial typical view illustrating a side of a structure in which a plurality of battery modules are stacked.

Referring to FIG. 1, a battery module assembly for providing high-power, large-capacity electric power includes a plurality of battery modules 100. Electrode terminals 110 and 120 protrude from one side of each battery module 100. The electrode terminals 110 and 120 of the battery modules 100 are arranged on the same line such that the electrode terminals 110 and 120 are parallel to the direction in which the battery modules 100 are stacked. Also, each of the protruding electrode terminals 110 and 120 is provided at the outer circumference thereof with a thread (not shown) by which each of the protruding electrode terminals 110 and 120 is easily coupled to a conductive connecting member for electrically interconnecting the neighboring battery modules 100.

FIG. 2 is a front perspective view typically illustrating an electrode terminal connecting device according to an embodiment of the present invention, and FIG. 3 is a rear perspective view typically illustrating the electrode terminal connecting device according to the embodiment of the present invention.

Referring to these drawings, the electrode terminal connecting device 200 includes a conductive connecting member 210 for electrically interconnecting electrode terminals (not shown), an insulative sheathing member 220 surrounding the conductive connecting member 210 for protecting connection regions between the conductive connecting member 210 and the electrode terminals from the outside, and an insulative cap 230 for opening and closing an open front of the insulative sheathing member 220.

The conductive connecting member 210 is provided with a pair of through-holes 212 and 213 through which the electrode terminals 110 and 120 (see FIG. 1) of each battery module are mechanically coupled, respectively.

The insulative sheathing member 220, surrounding the conductive connecting member 210, is provided with a side wall 222 formed at the outer circumference of the conductive connecting member 210 such that the side wall 222 has a predetermined height H. For easy connection between the electrode terminals 110 and 120 and the conductive connecting member 210, the front of the insulative sheathing member 220 is open. For easy installation of the conductive connecting member 210, a portion of an open rear A of the insulative sheathing member 220 is closed, i.e., the insulative sheathing member 22 is constructed to have an up-and-down connection structure 223.

The insulative cap 230 is connected to a top B of the insulative sheathing member 220 by a pair of hinge structures 231 for opening and closing the open front of the insulative sheathing member 220. Hollow buffers 232 and 233 protrude from the inside of the insulative cap 230 such that the hollow buffers 232 and 233 surround the through-holes 212 and 213 of the conductive connecting member 210.

Coupling portions 226 and 227 protrude from an inside 218 of the insulative sheathing member 220 approximately at a height corresponding to the thickness of the conductive connecting member 210. The coupling portions 226 and 227 are constructed in a downwardly tapered structure. Consequently, the conductive connecting member 210, which is formed in the shape of a plate, is inserted into the insulative sheathing member 220 through the open front of the insulative sheathing member 220 such that the conductive connecting member 210 is placed at the inside of the insulative sheathing member 220, and the outer circumference of the conductive connecting member 210 is engaged with the coupling portions 226 and 227. After the engagement, the conductive connecting member 210 is prevented from separating from the insulative sheathing member 220 in the frontward direction by the tapered structure of the coupling portions 226 and 227. Also, the separation of the conductive connecting member 210 is prevented by the up-and-down connection structure 223 at the rear A of the insulative sheathing member 220.

At the outer circumference of the insulative cap 230 are formed three protrusion-type coupling portions 2301, 2302, and 2303. At the insulative sheathing member 220 are formed coupling grooves 2201, 2202, and 2203 corresponding to the protrusion-type coupling portions 2301, 2302, and 2303. The protrusion-type coupling portions 2301, 2302, and 2303 are fixedly fitted in the coupling grooves 2201, 2202, and 2203 of the insulative sheathing member 220, respectively.

Meanwhile, opposite sides of the insulative sheathing member 220 are constructed in a male-and-female coupling structure by which the insulative sheathing member 220 of the electrode terminal connecting device 200 is variably coupled to an insulative sheathing member 320 of another electrode terminal connecting device 300.

The male-and-female coupling structure includes coupling protrusions 224 and 225 extending in the height direction of the insulative sheathing member and a coupling groove 324 corresponding to the coupling protrusions 224 and 225. Consequently, it is possible to easily assemble a desired number of battery modules by the coupling structure formed at the opposite sides of the insulative sheathing member 220. When the coupling protrusions 224 and 225 are located at the right side of the insulative sheathing member 220 on the basis of the rear A of the insulative sheathing member 220, as shown in the drawings, the coupling groove 324 is located at the left side of the insulative sheathing member 220. Of course, it is also possible to locate the coupling protrusions 224 and 225 at the left side of the insulative sheathing member 220 and the coupling groove 324 at the right side of the insulative sheathing member 220, if necessary.

FIG. 4 is a perspective view typically illustrating an electrode terminal connecting device with an extending guide according to another embodiment of the present invention.

Referring to FIG. 4, the electrode terminal connecting device 400 includes hollow buffers 432 and 433 formed at an insulative cap 430.

The hollow buffers 432 and 433 are constructed in a hollow cylindrical structure integrally formed at the inside of the insulative cap 430. At the outer circumferences of the hollow buffers 432 and 433 are formed three supporting ribs 4321, 4322, 4323 and 4331, 4332, 4333, respectively. The supporting ribs 4321, 4322, 4323 and 4331, 4332, 4333 are located at regions where the hollow buffers 432 and 433 abut the insulative cap 430.

The hollow buffers 432 and 433 have a height h reaching a conductive connecting member 410 in a state in which the insulative cap 430 closes the open front of an insulative sheathing member 420. Consequently, when the insulative cap 430 closes the open front of the insulative sheathing member 420, the hollow buffers 432 and 433 extend to the conductive connecting member 410 to support the insulative sheathing member 420 and the insulative cap 430, thereby protecting the conductive connecting member 410 from an external force and preventing the occurrence of a short circuit.

Also, octagonal nuts 421 and 422, serving as coupling members, are threadedly engaged with threads (not shown) formed at the outer circumferences of electrode terminals protruding through through-holes (not shown) of the conductive connecting member 410, thereby achieving electrical connection and mechanical coupling therebetween. The hollow insides of the hollow buffers 432 and 433 are constructed in the form of an octagon corresponding to the outsides of the coupling members 421 and 422 coupled with the electrode terminals (not shown). Consequently, when the insulative cap 430 closes the open front of the insulative sheathing member 420, the hollow buffers 432 and 433 come into tight contact with the coupling members 421 and 422, thereby preventing the coupling members 421 and 422 from being loosened by vibration and impact.

Meanwhile, the electrode terminal connecting device 400 further includes a hollow guide 423 extending downward from one side of the insulative sheathing member 420.

The hollow guide 423 may be used to guide a power cable connected to electrode terminals of the outermost battery modules of the battery module assembly and a cable (not shown) connected to a service plug.

When the hollow guide 423 is located downward, as shown in the drawing, the cable is disposed below the electrode terminals. Alternatively, the hollow guide 423 may be rotated by 180 degrees in the horizontal direction such that the cable is disposed above the electrode terminals. If necessary, the hollow guide 423 may be located at the left side, although the hollow guide 423 is located at the right side as shown in the drawing.

In addition, an insulative guide cap 424 is further provided to open and close the open front of the hollow guide 423.

The insulative guide cap 424 is connected to the top of the insulative sheathing member 420 by a hinge structure 425. At opposite sides of the insulative guide cap 424 are formed protrusion-type coupling portions 426 and 427. At the hollow guide 423 are formed coupling grooves 428 and 429 corresponding to the protrusion-type coupling portions 426 and 427, respectively. The protrusion-type coupling portions 426 and 427 are fixedly fitted in the coupling grooves 428 and 429 of the hollow guide 423, respectively.

FIG. 5 is a typical view illustrating a structure in which the electrode terminal connecting devices of FIGS. 2 and 4 are arranged in a line.

Referring to FIG. 5, the electrode terminal connecting device arrangement structure 500 is constructed in a structure in which a plurality of electrode terminal connecting devices 200, 300, and 400 are arranged in a line such that the conductive connecting members are located toward the battery modules. The plurality of electrode terminal connecting devices 200, 300, and 400 are assembled by the male-and-female coupling structures formed at the opposite sides of the electrode terminal connecting devices 200, 300, and 400.

The electrode terminal connecting devices 400, each of which further includes the hollow guide, are located at opposite ends and the middle of the electrode terminal connecting device arrangement structure 500. A power cable (not shown) is located in the hollow guides 423 of the electrode terminal connecting devices 400 at the opposite ends of the electrode terminal connecting device arrangement structure 500, and a cable to be electrically connected to a service plug is located in the hollow guide 423 of the electrode terminal connecting devices 400 at the middle of the electrode terminal connecting device arrangement structure 500.

FIGS. 6 and 7 are perspective views typically illustrating a battery module assembly having the electrode terminal connecting devices according to the present invention mounted thereto, and FIG. 8 is a partially enlarged view typically illustrating a portion where the electrode terminal connecting devices are mounted in FIG. 6.

Referring to these drawings, the battery module assembly 600 is constructed in a structure in which a plurality of battery modules 100, having cathode and anode terminals protruding from the same sides thereof, are stacked. All the electrode terminals of the battery modules 100 are located at one side of the battery module assembly 600. Each of the electrode terminal connecting devices 200 electrically connects a cathode terminal of one battery module 100 and an anode terminal of another neighboring battery module.

In FIG. 7, the electrode terminal connecting devices 400, further including the hollow guides to guide a power cable and a cable electrically connected to a service plug 122, are mounted to the electrode terminals 116 and 118 of the outermost battery modules 102 and the electrode terminals 112 and 114 of the middle battery modules 102.

That is, the cable is connected to the service plug 122 from the electrode terminals 112 and 114 of the battery modules 102 located at the middle of the battery module assembly through the hollow guide of the electrode terminal connecting device 400.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the battery module according to the present invention has the effect of achieving connection between the electrode terminals, isolating the electrode terminal connection regions from the outside, and preventing the occurrence of a short circuit and the occurrence of a fire even when strong impact is applied to the battery module by the provision of the electrode terminal connecting device including the buffers, thereby greatly improving the safety of the battery module.

Also, the battery module according to the present invention has the effect of stably and easily achieving electrical connection and mechanical coupling between the electrode terminals by the provision of the electrode terminal connecting device, thereby easily designing the battery module assembly based on desired power and capacity without limitation.

The invention claimed is:

1. An electrode terminal connecting device for electrically interconnecting two or more battery modules, comprising:
   a conductive connecting member for electrically interconnecting electrode terminals of the battery modules, the conductive connecting member having two through-holes formed at positions corresponding to a distance between the electrode terminals;
   an insulative sheathing member for surrounding the conductive connecting member, a portion of an open rear of the insulative sheathing member being closed for easy installation of the conductive connecting member, the insulative sheathing member including a side wall protruding from an outer circumference of the conductive connecting member such that the side wall has a predetermined height; and an insulative cap connected to a top of the insulative sheathing member by a hinge structure for opening and closing an open front of the insulative sheathing member, the insulative cap having hollow buffers protruding from the inside thereof for surrounding portions of the electrode terminals protruding through the through-hole, wherein the hollow buffers are constructed in a hollow cylindrical structure integrally formed at the inside of the insulative cap.

2. The electrode terminal connecting device according to claim 1, wherein the insulative cap is provided at an outer circumference thereof with at least one protrusion-type coupling portion, the insulative sheathing member is provided with a coupling groove corresponding to the protrusion-type coupling portion, and the protrusion-type coupling portion is fixedly fitted in the coupling groove of the insulative sheathing member.

3. The electrode terminal connecting device according to claim 1, wherein the insulative sheathing member is provided at an inside thereof with a coupling portion, protruding in a downwardly tapered structure, located at a height corresponding to a thickness of the conductive connecting member for maintaining the installation state of the conductive connecting member.

4. The electrode terminal connecting device according to claim 1, wherein the hollow buffers have a height reaching the conductive connecting member in a state in which the insulative cap closes the open front of the insulative sheathing member.

5. The electrode terminal connecting device according to claim 1, wherein each of the hollow buffers is provided at an outer circumference of the hollow cylindrical structure thereof with at least one supporting rib located at a region where each of the hollow buffers abuts the insulative cap.

6. The electrode terminal connecting device according to claim 1, wherein the conductive connecting member has a length sufficient to electrically interconnect the two electrode terminals, and portions of the electrode terminals inserted through the through-holes are constructed in a male screw structure, whereby coupling members of a female screw structure are coupled to the electrode terminals inserted through the through-holes.

7. The electrode terminal connecting device according to claim 6, wherein each of the hollow buffers is constructed in a structure to surround an outside of the coupling member coupled to corresponding one of the electrode terminals.

8. The electrode terminal connecting device according to claim 7, wherein the hollow buffers have hollow insides corresponding to the outsides of the coupling members coupled with the electrode terminals.

9. The electrode terminal connecting device according to claim 1, wherein the insulative sheathing member is further provided at one side thereof with a guide for easily achieving installation and wiring of another linear connection member.

10. The electrode terminal connecting device according to claim 9, wherein the guide is constructed in a structure in which a hollow guide extends upward or downward from a position corresponding to the electrode terminals of the battery modules.

11. The electrode terminal connecting device according to claim 1, wherein the insulative sheathing member is provided at opposite sides thereof with a male-and-female coupling structure by which the insulative sheathing member of the electrode terminal connecting device is variably coupled to an insulative sheathing member of another electrode terminal connecting device.

12. The electrode terminal connecting device according to claim 11, wherein the male-and-female coupling structure includes a coupling protrusion extending in the height direction of the insulative sheathing member and a coupling groove corresponding to the coupling protrusion.

13. A battery module assembly wherein electrical connection is achieved using the electrode terminal connecting device according to claim 1.

14. The battery module assembly according to claim 13, wherein the battery module assembly is constructed in a structure in which a plurality of battery modules, having cathode and anode terminals protruding from the same sides thereof, are in tight contact with one another.

15. The battery module assembly according to claim 14, wherein the electrode terminals of the battery modules are arranged on the same line, and the electrode terminal connecting devices are mechanically coupled to electrical connection regions of the electrode terminals of the battery modules.

16. The battery module assembly according to claim 14, wherein a pair of electrode terminal connecting devices each further including a guide formed at one side of the insulative sheathing member thereof are disposed at the middle battery modules of the battery module assembly such that the electrode terminal connecting devices are adjacent to each other, and an electrode terminal connecting device further including a guide formed at one side of the insulative sheathing member is disposed at each of the outermost battery modules of the battery module assembly.

17. An electrode terminal connecting device for electrically interconnecting two or more battery modules, comprising:

a conductive connecting member for electrically interconnecting electrode terminals of the battery modules, the conductive connecting member having two through-holes formed at positions corresponding to a distance between the electrode terminals;

an insulative sheathing member for surrounding the conductive connecting member, a portion of an open rear of the insulative sheathing member being closed for easy installation of the conductive connecting member, the insulative sheathing member including a side wall protruding from an outer circumference of the conductive connecting member such that the side wall has a predetermined height; and an insulative cap connected to a top of the insulative sheathing member by a hinge structure for opening and closing an open front of the insulative sheathing member, the insulative cap having hollow buffers protruding from the inside thereof for surrounding portions of the electrode terminals protruding through the through-hole;

wherein the hollow buffers have a height reaching the conductive connecting member in a state in which the insulative cap closes the open front of the insulative sheathing member.

18. An electrode terminal connecting device for electrically interconnecting two or more battery modules, comprising:

a conductive connecting member for electrically interconnecting electrode terminals of the battery modules, the conductive connecting member having two through-holes formed at positions corresponding to a distance between the electrode terminals;

an insulative sheathing member for surrounding the conductive connecting member, a portion of an open rear of the insulative sheathing member being closed for easy installation of the conductive connecting member, the insulative sheathing member including a side wall protruding from an outer circumference of the conductive connecting member such that the side wall has a predetermined height; and an insulative cap connected to a top of the insulative sheathing member by a hinge structure for opening and closing an open front of the insulative sheathing member, the insulative cap having hollow buffers protruding from the inside thereof for surrounding portions of the electrode terminals protruding through the through-hole;

wherein the conductive connecting member has a length sufficient to electrically interconnect the two electrode terminals, and portions of the electrode terminals inserted through the through-holes are constructed in a male screw structure, whereby coupling members of a female screw structure are coupled to the electrode terminals inserted through the through-holes.

19. An electrode terminal connecting device for electrically interconnecting two or more battery modules, comprising:

a conductive connecting member for electrically interconnecting electrode terminals of the battery modules, the conductive connecting member having two through-holes formed at positions corresponding to a distance between the electrode terminals;

an insulative sheathing member for surrounding the conductive connecting member, a portion of an open rear of the insulative sheathing member being closed for easy installation of the conductive connecting member, the insulative sheathing member including a side wall protruding from an outer circumference of the conductive connecting member such that the side wall has a predetermined height; and an insulative cap connected to a top of the insulative sheathing member by a hinge structure for opening and closing an open front of the insulative sheathing member, the insulative cap having hollow buffers protruding from the inside thereof for surrounding portions of the electrode terminals protruding through the through-hole;

wherein the insulative sheathing member is provided at opposite sides thereof with a male-and-female coupling structure by which the insulative sheathing member of the electrode terminal connecting device is variably coupled to an insulative sheathing member of another electrode terminal connecting device.

* * * * *